United States Patent [19]

Staub, Jr.

[11] 4,291,790

[45] Sep. 29, 1981

[54] TORQUE CONVERTER CLUTCH AND VIBRATION DAMPER

[75] Inventor: Vincent M. Staub, Jr., Dayton, Ohio

[73] Assignee: General Motors Corporation, Detroit, Mich.

[21] Appl. No.: 131,924

[22] Filed: Mar. 21, 1980

[51] Int. Cl.³ .......................... F16H 45/02; F16D 3/14
[52] U.S. Cl. ................................. 192/3.28; 192/106.1; 74/411; 64/27 NM
[58] Field of Search ................. 192/106.1, 106.2, 3.21, 192/3.28, 3.29, 3.3, 3.31, 70.17; 64/27 NM, 27 R, 27 C, 27 S, 29; 74/411

[56] References Cited

U.S. PATENT DOCUMENTS

| | | | |
|---|---|---|---|
| 2,858,855 | 11/1958 | Piganol . | |
| 3,039,578 | 6/1962 | Peras | 192/106.1 |
| 3,406,583 | 10/1968 | Baier | 74/411 |
| 3,472,092 | 10/1969 | Doolittle et al. | 74/411 X |
| 3,554,045 | 1/1971 | Littmann | 74/711 |
| 3,877,253 | 4/1975 | Yeagle | 64/29 |

FOREIGN PATENT DOCUMENTS 2812716  11/1979  Fed. Rep. of Germany ..... 192/3.25

Primary Examiner—George H. Krizmanich
Attorney, Agent, or Firm—Donald F. Scherer

[57] ABSTRACT

A torque converter clutch and vibration damper has a selectively engageable pressure plate with an internally toothed gear secured thereto. A plurality of pinion gear members are rotatably mounted on an output hub and mesh with the internally toothed gear. Each pinion gear has one end of a link member pivotally mounted thereon. The other end of each link member is connected to a pin which is guided in a radial slot and operatively connected with an elastomeric belt member. Relative angular excursion between the pressure plate and the output hub, caused by torque transmission, results in relative motion between the meshing gears so that the pin connected to each link member is moved radially outward in the slots formed in the output hub. The pin movement causes a change in the length of the elastomeric belt operatively connected therewith so that a change in the torque capacity of the vibration damper occurs.

4 Claims, 4 Drawing Figures

TORQUE CONVERTER CLUTCH AND VIBRATION DAMPER

This invention relates to torque converter clutch and vibration damper mechanisms, and more particularly, to such mechanisms wherein the damper has an elastomeric member which provides a reaction force to control the angular excursion between the input and output members of the mechanism.

It is an object of this invention to provide an improved torque converter clutch and vibration damper mechanism, wherein a plurality of meshing gears are connected to the input and output members respectively of said mechanism, and wherein relative movement between the meshing gears is controlled by an elastomeric belt member.

It is another object of this invention to provide an improved torque converter clutch and damper mechanism, wherein a ring gear is secured to the clutch portion and a plurality of pinions are rotatably mounted on the output portion of the mechanism, and wherein the gears are in mesh such that angular excursion between the input and ouput results in relative movement of the gear members, and wherein each pinion gear member has pivotally connected thereto a link member which is guided for radial movement in a slot formed in the output member, with such radial movement being controlled by an elastomeric belt member which provides a reaction force for the pinion gear members.

These and other objects and advantages of the present invention will be more apparent from the following specification and drawings in which.

Figure 1:
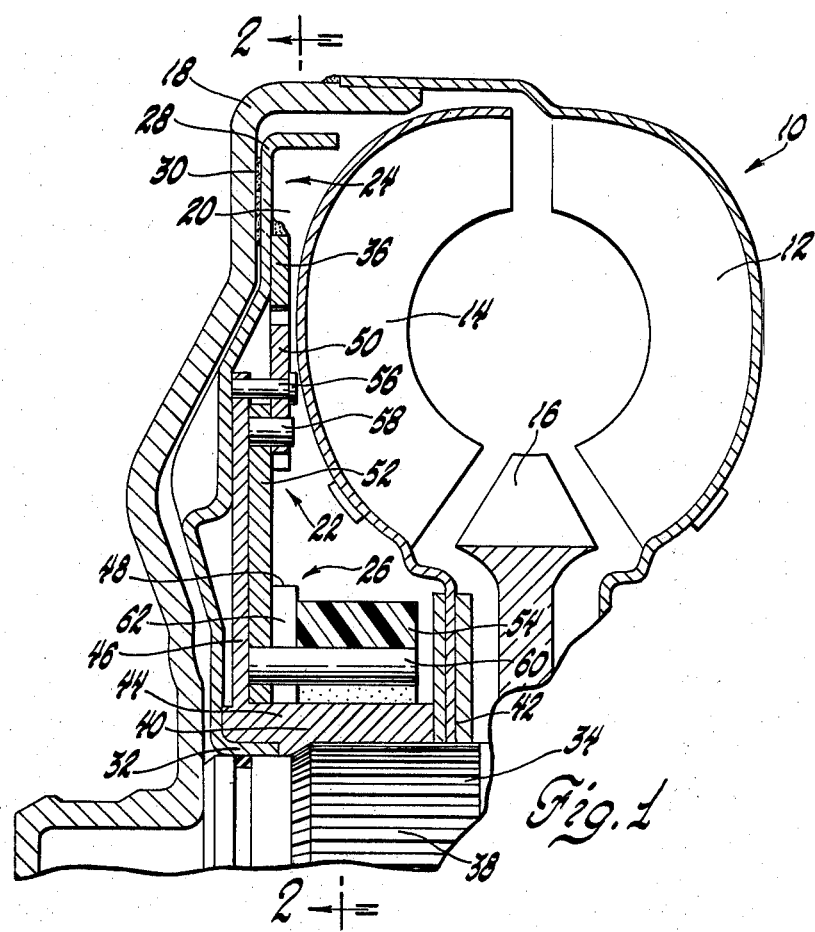
FIG. 1 is a cross-sectional side elevational view of a torque converter clutch and damper assembly.

Referring to the drawings, wherein like characters represent the same or corresponding parts throughout the several views, there is seen in FIG. 1 a conventional torque converter mechanism, generally designated 10, having an impeller 12, a turbine 14 and a stator 16. The impeller 12 is welded at its outer periphery to an input shell 18 which cooperates with the turbine member 14 to provide a clutch chamber 20. The torque converter 10 may be constructed in accordance with any of the well-known hydrodynamic devices which are currently available.

A clutch and damper assembly, generally designated 22, is disposed in the clutch chamber 20 between the input shell 18 and the turbine 14. The assembly 22, includes a clutch portion, generally designated 24, and a damper portion, generally designated 26. The clutch 24 includes a pressure plate 28, which has secured thereto, a friction lining 30 adapted to frictionally engage the inner surface of the input shell 18. The pressure plate 28 has a flange 32 formed on its inner periphery which is slidably disposed on a torque converter output shaft 34. By the admission of fluid pressure to the clutch chamber 20, either between the pressure plate 28 and input shell 18, or between the pressure plate 28 and the turbine 14, the clutch 24 can be disengaged or engaged, respectively.

As is well-known, such clutches are connected in parallel drive relationship with the torque converter 10 to provide an improved driveline efficiency. The operation of controls for such clutches is disclosed in U.S. Pat. No. 3,252,352 to General et al., issued May 24, 1966, and U.S. Pat. No. 3,693,478 to Malloy, issued Sept. 26, 1972. The pressure plate 28 has secured thereto, an internally toothed gear 36, commonly referred to as a ring gear.

The output shaft 34 has a spline portion 38 to which is drivingly connected an output member 40. The turbine 14 has a hub portion 42 which is secured to the output shaft 34, or in the alternative, can be secured to output member 40. The output member 40 has a sleeve portion 44, a hub portion 46 and a flange portion 48. The sleeve portion 44 has a spline formed therein which meshes with the spline 38 on output shaft 34.

The vibration damper 26 includes a plurality of pinion gears 50, a plurality of links 52 and a continuous elastomeric belt member 54. The pinion gears 50 are rotatably mounted on pins 56 connected to the hub 46 and mesh with the ring gear 36. The link members 52 each have a pair of pins 58 and 60 disposed adjacent the ends thereof. The pins 58 provide a pivotal connection between respective pinion gears 50 and links 52 and the pins 60 are slidably disposed in radial slots 62 formed in the flange 48.

Figure 2:
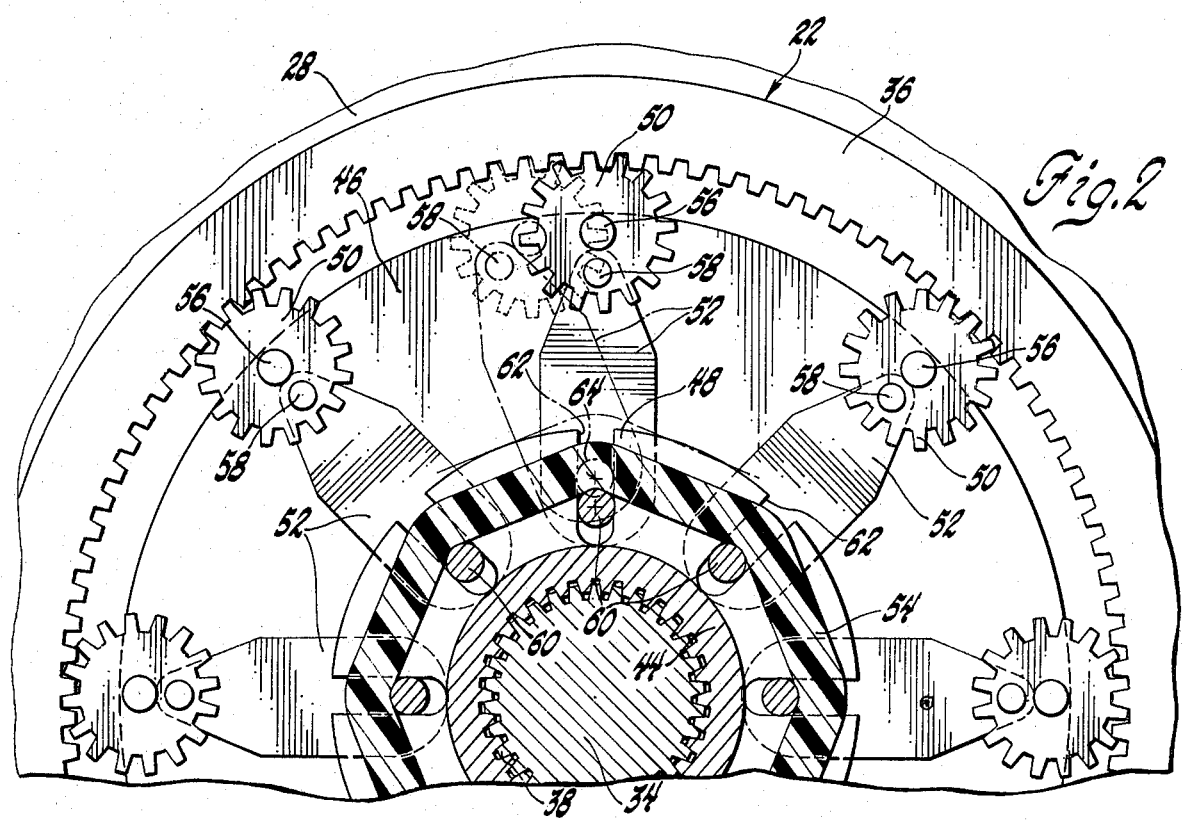
FIG. 2 is a view, partly in section, taken along line 2—2 of FIG. 1.

As can best be seen in FIG. 2, the elastomeric belt 54 circumscribes the pins 60. The belt is stressed, as seen in FIG. 2, so as to provide radial alignment between the centers of pins 56, 58 and 60. The prestressing of the belt 54 will provide minimum torque capacity in the damper 26, such that the clutch and damper assembly 22 will return to the rest position, shown in FIG. 2, when there is no torque being transmitted by the clutch and damper assembly 22.

The input shell 18 is adapted to be connected to an internal combustion engine, not shown, such that power from the engine can be transmitted through the torque converter 10 to the output shaft 34. If the clutch 24 is engaged, the power is transmitted from the engine through the clutch and damper assembly 22 to the output shaft 34 bypassing the torque converter 10. As the amount of torque transmission increases, there will be relative movement between the ring gear 36 and pinion gears 50, such as shown in phantom lines in FIG. 2. This relative movement results in angular displacement of the pin 58 relative to a line connecting the centers of pins 56 and 60. The angular displacement of pin 58 causes the pin 60 to move radially outward in slot 62 toward the position 64, shown in phantom line in FIG. 2. This radial outward movement of pins 60 causes an increase in tension in the belt 54 such that further relative movement between gears 50 and gear 36 requires a further increase in torque transmission.

The elastomeric belt, in cooperation with the gears 50 and 36, and link 52, will also accommodate the transient torsional vibrations commonly associated with internal combustion engines. The so-called torque spikes are accommodated by rapid angular displacement of gears 50 and radial motion of pins 60 such that the transient torsional vibrations are isolated from the output shaft 34. The belt 54 is preferably designed to provide a controlled angular excursion rate, between the input shell 18 and the output shaft 34, in the range of 60 to 290 Nm/rad. This excursion rate range has been found to be useful with most automotive type engine and transmission combinations. Other ranges may be desirable for heavier vehicles, such as trucks and buses. This range can be selected by the designer since he merely changes the elastomeric material having the desired characteristics. Materials manufactured by DuPont under the trade name Hytrel or Eloc, have been found suitable.

Figure 3:
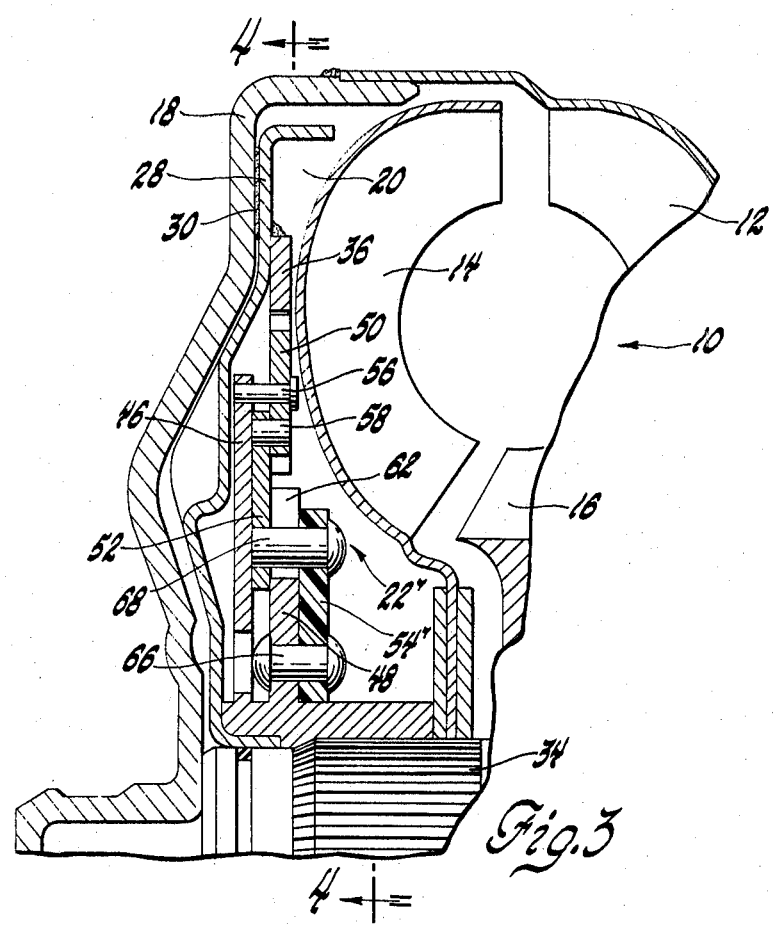
FIG. 3 is a view similar to FIG. 1 showing another embodiment of the present invention.
Figure 4:
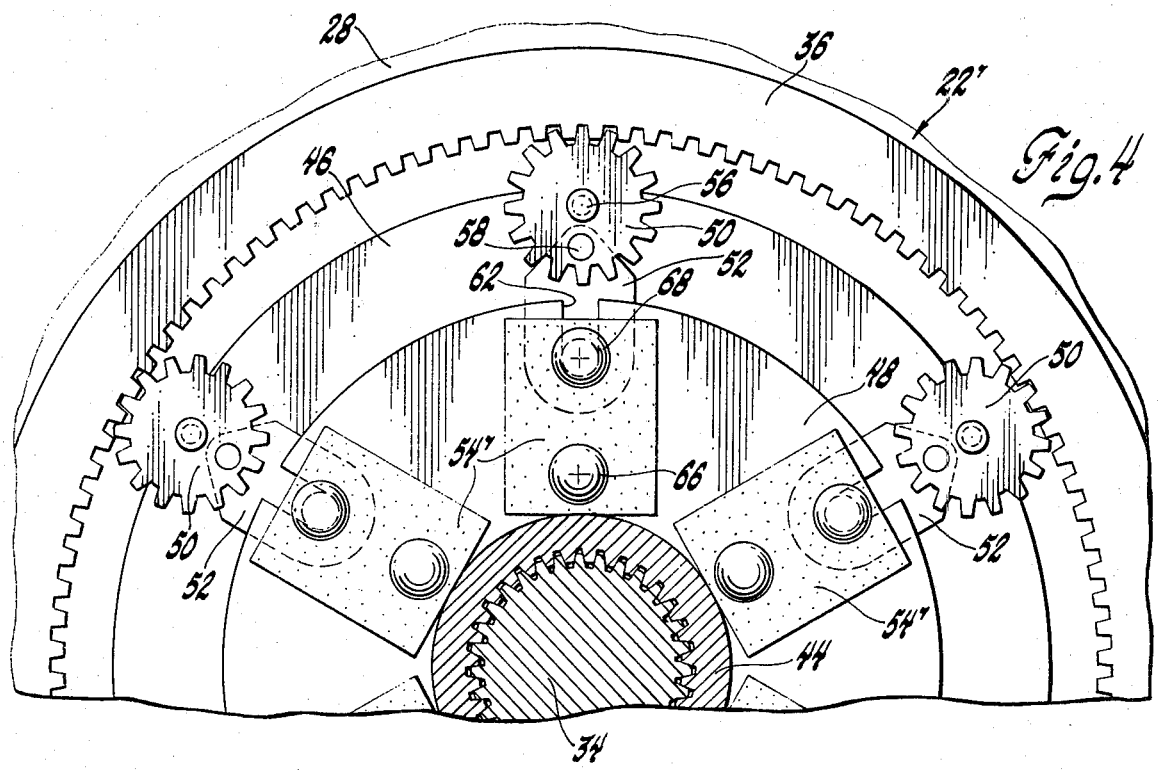
FIG. 4 is a view taken along line 4—4 of FIG. 3.

The clutch and damper assembly 22', seen in FIG. 3, is essentially the same as that shown in FIG. 1. The primary differences between the damper assembly shown in FIG. 1 and that shown in FIG. 3, is in the elastomeric belts. In FIGS. 1 and 2, a single continuous belt is utilized, while in FIGS. 3 and 4, a plurality of belts 54' are disposed radially between pins 66 secured to flange 48 and pins 68 disposed in slots 62 and connected with links 52. The remaining components of the clutch and damper assembly 22' have been given the same numerical designations as that used in FIG. 1.

When the clutch plate 28 of assembly 22' is engaged such that torque is transmitted, the gears 50 will undergo rotation relative to gear 36 resulting in angular displacement of the center of pin 38 relative to the center of pin 56. This angular displacement will result in pin 68 moving radially outward in slot 62, such that the length of each belt 54' will increase accordingly. It is the increase in length of belts 54' which results in the reaction force which occurs between gears 50 and 36. It is a reaction force which, if course, establishes the torque transmission capacity of the assembly 22 or 22'. The elastomeric belts 54' will operate with the mechanism in a manner similar to that described above for belt 54, such that transient torsional vibrations can be accommodated without transmitting such vibrations to the output member 44. Also, as mentioned above with the belt 54, the belts 54' can be designed and selected to provide the desired angular excursion rate.

It should be noted that the elastomeric belt 54 has substantially no relative rotary or linear motion with pin 60 since the pin motion is radially inward and outward, and the belt motion is that of expansion and contraction. The same holds true for belts 54' since they move strictly radial. The pins 68 move in a radial direction and the belts 54' move in a radial direction. Thus, the fatigue stresses on the belts 54 and 54' are kept to a minimum, such that a long operating life is provided.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A torque converter clutch and torsional vibration damper comprising: a clutch pressure plate adapted to frictionally engage the input member of a torque converter; an output hub adapted to be drivingly connected to the output shaft of a torque converter and including a plurality of circumferentially spaced radial slots; an internally toothed gear member secured to said clutch pressure plate; a plurality of circumferentially spaced pinion gears rotatably mounted on said output hub and meshing with said internally toothed gear member; a plurality of circumferentially spaced link members connected between each respective pinion gear and radial slot, said connection at said pinion gear being pivotal and displaced radially from the center of said pinion gear toward the center of said output hub when the clutch is not transmitting torque; and an elastomeric belt operatively connected to said link members adjacent said radial slot connections, said elastomeric belt exerting an increasing force on said pinion gears through said link members as torque transmission through said torque converter clutch increases and said elastomeric belt being operable to permit relative angular displacement between said clutch pressure plate and said output hub.

2. A torque converter clutch and torsional vibration damper comprising: a clutch pressure plate adapted to frictionally engage the input member of a torque converter; an output hub adapted to be drivingly connected to the output shaft of a torque converter and including a plurality of circumferentially spaced radial slots; an internally toothed gear member secured to said clutch pressure plate; a plurality of circumferentially spaced pinion gears rotatably mounted on said output hub and meshing with said internally toothed gear member; a plurality of circumferentially spaced link members connected between each respective pinion gear and radial slot, said connection of said pinion gear being pivotal and displaced radially from the center of said pinion gear toward the center of said output hub when the clutch is not transmitting torque; and elastomeric belt means operatively connected to said link members adjacent said radial slot connections for providing controlled angular excursion in the range of 60 and 290 Nm/rad between said clutch pressure plate and said output hub when said clutch pressure plate is frictionally engaged to transmit driving torque to said output hub in a path parallel to and substantially bypassing said torque converter.

3. A torque converter clutch and torsional vibration damper comprising: a clutch pressure plate adapted to frictionally engage the input member of a torque converter; an output hub adapted to be drivingly connected to the output shaft of a torque converter and including a plurality of circumferentially spaced radial slots; an internally toothed gear member secured to said clutch pressure plate; a plurality of circumferentially spaced pinion gears rotatably mounted on said output hub and meshing with said internally toothed gear member; a plurality of circumferentially spaced link members connected between each respective pinion gear and radial slot, said connection at said pinion gear being pivotal and displaced radially from the center of said pinion gear toward the center of said output hub when the clutch is not transmitting torque; pin means cooperating with each of said link members for slidably connecting said link members respectively with said radial slots; and a continuous elastomeric belt operatively connected in circumscribing relation with said pin means adjacent said radial slot connections, said elastomeric belt exerting an increasing force on said pinion gears through said pin means and said link members to thereby increase the torque capacity of the vibration damper as torque transmission through said torque converter clutch increases and said elastomeric belts being operable to permit relative angular displacement between said clutch pressure plate and said output hub.

4. A torque converter clutch and torsional vibration damper comprising: a clutch pressure plate adapted to frictionally engage the input member of a torque converter; an output hub adapted to be drivingly connected to the output shaft of a torque converter and including a plurality of circumferentially spaced radial slots; an internally toothed gear member secured to said clutch pressure plate; a plurality of circumferentially spaced pinion gears rotatably mounted on said output hub and meshing with said internally toothed gear member; a plurality of circumferentially spaced link members connected between each respective pinion gear and radial slot, said connection at said pinion gear being pivotal and displaced radially from the center of said pinion gear toward the center of said output hub when the clutch is not transmitting torque; pin means cooperating with each of said link members for slidably connecting said link members respectively with said radial slots; and an elastomeric belt operatively connected radially between said pin means and said output hub adjacent said radial slot connections, said elastomeric belts exerting an increasing force on said pinion gears through said pin means and said link members as torque transmission through said torque converter clutch increases and said elastomeric belt being operable to permit relative angular displacement between said clutch pressure plate and said output hub.

* * * * *